United States Patent Office 2,892,800
Patented June 30, 1959

2,892,800

ADSORPTION SUBSTANCES PREPARATION

George Taipale, also known as Yrjö Taipale, Wyandotte, Mich., assignor to American Silicate Company, Inc., Detroit, Mich., a corporation of Michigan No Drawing. Application April 28, 1955
Serial No. 504,694

12 Claims. (Cl. 252—450)

This invention is that of a method of preparing from a raw or crude, low swelling bentonite clay, a coarse or granular activated bentonite clay significantly applicable in percolation processes. The method of the invention, in addition to providing a substantial yield of a granular product of remarkable mechanical strength from, also develops at least the adsorptive-decolorizing activity of, not only a raw bentonite clay such as montmorillonite, prophyllite, and halloysite, but also of the low grade, low-swelling sub-bentonites. As recognized in the art, the low swelling bentonites exclude colloidal bentonite such as the Wyoming type, and are also known as sub-bentonites.

The expression a "low swelling bentonite-clay" is used in this specification and its appended claims in the broad sense to embrace generically the various high grade and low grade low swelling bentonites themselves, such as montmorillonite, prophyllite, and halloysite, as well as the bentonite-like montmorillonite-like aluminum silicates often referred to respectively as the bentonite family or the montmorillonite family of clays. Thus, the quoted expression includes also not only the good or first (or high) grade of commonly or regularly used low-swelling bentonites but also the poor (or low) grade or what may be called second rate low-swelling bentonite clays which for the most part have heretofore been completely ignored as starting materials for the so-called bleaching clays. The process of my invention is particularly advantageously applicable to such second rate low-swelling bentonite clays, and especially to and containing appreciable quantities of calcium carbonate. Thereby, they all now are readily applicable as starting materials that can be converted effectively to a desirably suitable grade of granular activated clay exhibiting remarkable decolorizing and other activity.

The invention includes also the particular granular activated clays made available by the process of my invention in its several modifications.

In the filtration and decolorizing of vegetable and animal oils as well as mineral oils and other hydrocarbon products with activated (adsorptive) clays, the percolation method is quite widely used. In prior attempts to produce coarse particles of activated bentonite clays suitable for use in these percolation processes, the particles lacked the necessary mechanical strength. Upon putting them into use, the particles broke down into powders which then packed together, and thus rendered them unsuitable for percolation use. Such products on being contacted by liquids to be percolated through them, especially on being contacted by any water present in the liquid to be percolated through, disintegrated into such undesirable powder form.

This difficulty, and other disadvantages, in the prior attempted granular products are avoided by the coarse, granular activated bentonite clays obtained by the activation process of this invention.

Considered broadly, the process of the invention comprises contacting the raw or crude low swelling bentonite clay with hydrochloric acid, in the ratio (by weight) of from about eight and one-half to about twenty parts, and advantageously from about ten to about seventeen parts, and especially of about fifteen parts, of the acid (calculated as anhydrous hydrogen chloride), per one hundred parts of raw bentonite clay (calculated on the bone dry basis), for from about fifteen to about twenty minutes (for raw clay particles of about one-quarter inch size, and for proportionately longer time for larger starting size), under atmospheric conditions; then adding water and sulfuric acid in respective amounts to provide from about twenty to about thirty parts by weight of sulfuric acid (calculated as anhydrous sulfuric acid) and from about two hundred to about five hundred parts by weight of water (including the water contained in raw starting bentonite clay and in each of the commercial hydrochloric and sulfuric acids used, and whatever water was separately added), and agitating the batch until adequate activation of the bentonite is attained; and then separating the granular activated bentonite clay from the acid aqueous slurry of fines and dissolved salts produced by the action of the acids on the crude bentonite clay starting material.

As the major uses of the activated bentonite clays is with various glyceride oils such as vegetable and animal oils and petroleum and various hydrocarbon oils and in drying and catalytic processes, the finished granular activated bentonite clays are dried usually and classified by suitable screening into desired size (or mesh) ranges.

Any of the foregoing described raw or crude low swelling bentonites can be used in the process. The raw bentonite coming from the quarries in lumps, for example, of around six to eight inches or so in longest dimension, beneficially are crushed to about one-quarter inch size. It advantageously is dried, under conditions to avoid raising the temperature of the clay above one hundred and five degrees centigrade, to reduce its moisture content to between about ten and about twenty percent.

Any suitable method can be used to bring the initial moisture content within this range, for example, exposing the crushed product to a stream of hot air or other inert gases or gas, or by indirect heat exchange in suitable drying equipment employing a temperature not exceeding one hundred and twenty degrees centigrade, or even exposing the raw material to the open air. Whichever drying method is used, the partially dried raw clay then can be allowed to cool.

In the initial contact of the raw clay with the hydrochloric acid, the acid can be distributed evenly over the charge of clay in a suitable treating vessel, such as a glass-lined autoclave equipped with agitator (for agitation in the subsequent joint acids treatment step after this hydrochloric acid has penetrated through the raw clay). However, it is advantageous first to charge the hydrochloric acid into the treating vessel and then to dump the raw bentonite clay particles into the acid.

This first acid, or solely hydrochloric acid, contact is best carried out without agitation and at atmospheric conditions, for the indicated time according to the size of the pieces of the crude clay in the charge. If they are greater than about one-quarter of an inch, the contact time is to be increased above about fifteen to about twenty minutes, as an initial trial test should indicate is needed to allow adequate penetration of the pieces by the hydrochloric acid.

After the contact of the raw bentonite clay with the hydrochloric acid has continued long enough for the acid adequately to penetrate the clay pieces, the water and the sulfuric acid are added, to the extent described above, while the reaction mixture is agitated.

Advantageously, the water is added first. Ordinarily, no benefit occurs in initially mixing the water and the sulfuric acid for addition jointly. However, they can be added jointly if a sufficiently dilute sulfuric acid is available readily without adding to the cost. Generally, the sulfuric acid should not precede the water because its reaction with the clay would be so exothermic as to present a very serious control problem.

The agitation then is continued until the activation of the bentonite clay is completed. This usually is noted by the ratio of the silica ($SiO_2$) to the alumina ($Al_2O_3$), which should range from about eight parts to about twenty parts of silica to about one part of alumina, depending on the application to be made of the finished product.

This second state of the activation is best carried out at elevated temperature and beneficially at least at the boiling point of the mixture, and most advantageously above its boiling point and thus at superatmospheric pressure. The temperature should not exceed two hundred and twenty degrees centigrade, to avoid breakdown of the activated character of the clay and any destruction of its crystalline structure.

When the second stage of the activation (i.e. with both of the acids present) is conducted at the boiling point of the mixture and at atmospheric pressure, the activation ordinarily should be completed in from about eight to about twelve hours. When it is conducted at about one hundred and fifty degrees centigrade (and obviously at the corresponding pressure to enable reaching that temperature), the activation generally is finished in about three hours. Operating at two hundred and twenty degrees centigrade (and its corresponding pressure), the activation is done in about an hour.

When the activation is completed, the agitation is discontinued (the autoclave is opened if superatmospheric pressure was used) and the reaction mixture is allowed to cool at least until boiling discontinues, i.e. to slightly below about one hundred degrees centigrade. To effect this cooling the autoclave can be water-jacketed or equipped with cooling coils that avoid interference with the agitator. (Alternatively, the water-jacket could serve as a steam jacket, and the cooling coils as heating coils, for supplying the heat during the second stage of the activation, i.e. with both of the acids, when it is conducted at an elevated temperature).

After the batch has cooled sufficiently for the boiling to have discontinued, the reaction mixture can be sluiced out of the autoclave (or other treating vessel) onto a screen of suitable mesh, for example, ninety or eighty or forty mesh. There the acid aqueous slurry of the fines and dissolved salts is separated from the hard granules of activated clay, for example, by flushing the discharged reaction mixture while it is on the screen with a stream of water, preferably warm, that washes the fines through the screen.

It is advantageous for the coarse granular particles of the thus activated bentonite clay to be washed at least substantially to remove water-soluble alkali and alkaline earth metal, such as sodium, potassium, calcium and magnesium, salts as well as iron and aluminum and other metal salts produced by the acid treatments. This is done best by transferring the granular material to suitable washers, conveniently open cylindrical tanks (e.g. wood, stainless steel, or rubber-lined) where the washing can be enhanced and expedited by injecting live steam into the wash water.

The washing advantageously is done with demineralized water. This avoids adding alkaline earth, e.g. calcium and magnesium, oxides in the activated clay particles. Good quality water of low calcium and magnesium content, if available, can suffice without being demineralized.

The sufficiency of washing is indicated when the acidity of the product is reduced to about one-tenth percent of hydrochloric acid, and preferably below half of that, on the anhydrous basis (i.e. one milligram or preferably under one-half milligram, of HCl per gram of bone dry activated clay; determined, for example, by titrating an aqueous suspension of the clay with one-tenth normal sodium hydroxide solution). Usually three washings with demineralized, or low calcium and magnesium water, with injection of live steam for elevating the temperature and agitation, are adequate.

The thus washed product then is dried, for example, in a rotary kiln by a hot air or other inert gas stream other than flue gases from combustion of a fuel, or in a tunnel drier by indirect heat exchange or otherwise. The dried product is classified by screening into desired size or mesh ranges. Generally, the described processing yields a granular product with sixty percent between one-quarter inch to forty mesh, and seventy-five to eighty percent being from one-quarter inch to ninety mesh.

The invention is illustrated by, but not restricted to, the following examples.

Raw low swelling bentonite clay was crushed to one-quarter inch size pieces and dried in a drum drier to fifteen percent moisture content. Sixteen hundred pounds of this crushed and dried raw bentonite then were dropped into six hundred and fifty pounds of twenty degree Baumé muriatic acid in a glass-lined, jacketed autoclave equipped with agitator and having a bottom dump. The raw bentonite clay was left in contact with the muriatic acid without agitation and at atmospheric conditions for fifteen minutes. Then six hundred gallons of water and two hundred and ninety-two pounds of sixty-six degree Baumé commercial sulfuric acid were added, and agitation was started soon as the agitator could be moved readily. The autoclave was closed and steam fed into its jacket to heat the reaction batch to one hundred to one hundred and five degrees centigrade and to hold it at that level for ten hours, during which agitation was continued.

The steam was then shut off and cooling water introduced into the jacket about the autoclave which then was opened. When the temperature of the reaction mixture fell below one hundred degrees centigrade, the cooling water was turned off. The bottom dump was opened and the mixture allowed to drop, flushed out with warm water, onto a ninety mesh screen where a stream of warm water was played over the mixture to sluice out of it the fines and so much of the aqueous acid solution of the salts dissolved out of the clay as was washed out with the fines.

The granular activated clay pieces and particles then were transferred to more than enough demineralized water, in a wooden vertically cylindrical wash tank, to drown them. Live steam was introduced into the mixture, from a perforated coil at the bottom of the tank, to agitate the mixture and simultaneously to increase its temperature and thereby to accelerate the washing out of the water-soluble salts. The wash water then was drained off. This tank washing procedure was twice repeated.

The thus washed activated granular bentonite then was dropped through the trap-door in the bottom of the wash tank and run into a rotary drier and dried by a stream of hot air. The dry output from the drier was then run onto the classifying screens for sizing.

The foregoing example was repeated in its various details except for increasing the temperature during the second activation stage (i.e. after addition of the water and sulfuric acid) to one hundred and fifty degrees centigrade (and its corresponding pressure). The activation then was concluded in three and one-half hours.

The same example was repeated in its various details except to increase the temperature to two hundred and twenty degrees centigrade (at its corresponding pressure). The activation then was completed in one and one-quarter hours.

In place of the glass-lined autoclave, one with a hard lead lining can be used. While it has been found more efficient to let the first acid treatment, that is wherein the raw bentonite soaks in the hydrochloric acid, take place in the lined autoclave, it is also possible to conduct that step in a wooden tank or any other that is resistant to the concentration of hydrochloric acid used.

Variations in the respective ratios of each of the acids to the bentonite can be made within the above disclosed ranges, as guided by the analysis of the particular raw low swelling bentonite or mixture of any of them and the combination of operating conditions used. Ordinarily, the higher its moisture content, the higher the ratio at least of the muriatic acid. Generally, the higher its content of alkaline earth metals as calcium and magnesium, and also of the iron and aluminum in the raw clay, use of higher ratio of the acids is indicated. Then also, the higher the content of calcium and iron, the higher should be the hydrochloric acid ratio to the sulfuric. The higher the temperature and pressure to be used in the second acid activation step (the one with both acids), the lower may be the concentration of the acids, in many cases. It is advantageous then to conduct the second acid activation step at elevated temperature.

Remarkably distinctive advantages result from operating under superatmospheric pressure and especially at at least about three atmospheres and below that at which combined water is disaggregated from the clay, and preferably between about fifty and about one hundred and fifty pounds per square inch. This corresponds to a temperature range of between about one hundred and thirty-five and about one hundred and eighty-five degrees centigrade. Operating under elevated pressure considerably reduces the treatment time for the obtainable activation. Corresponding increase in overall productive capacity from the same apparatus results.

Moreover, the resulting more intense penetration of the acids into the molecule of the clay in operation at elevated temperature, particularly above the boiling point of the mixture, and at the corresponding elevated pressure, gives distinct advantages in the end product activated clay, and likewise in the activation itself by enabling a smaller quantity of acid to be used to attain the effective activation of the clay.

By operating under these superatmospheric pressures, this process enables having uniform from batch to batch of a particular starting clay not only the total required quantity of the combined amounts of both of the acids, but also their total concentration in the mixture, as well as the ratio between the sulfuric and hydrochloric acids, and also the ratio of solid phase to liquid phase of the reaction mixture set to be obtained for the particular starting clay and the combination of reaction conditions determined for it. Frequently, the higher the concentration of the total of the two acids, the more desirable it is to operate at a lower pressure within the indicated range, or at times to cut down the duration of the treatment if the activation is conducted at a pressure in the higher portion of the pressure range.

Thus, operating with a certain clay at the boiling point of the mixture and at atmospheric pressure, in a particular autoclave it was possible to turn out two batches per day. However, operation at four atmospheres (and its corresponding temperature) enabled turning out four to six batches daily.

With close estimation of the relative quantities of hydrochloric and sulfuric acids to use, from the analysis of the raw clay to be treated and the selected operating conditions, quite commonly the activation is completed when the acids have been consumed.

The fines sluiced through the separation screen, or obtained from any other method, used for separating the granular activated product after the activation, need not be discarded. The mixture of them in the water can be filter-pressed, and after drying the press cake, the thus separated fines can be used in contact filtration or other processes where a fine clay is needed.

The agitation of the reaction mixture of the clay and the liquid phase containing both the hydrochloric and the sulfuric acids need be sufficient at least to maintain a relatively homogeneous suspension of the clay solid phase in the liquid phase.

It is understood, of course, that the raw clay contains both ordinary moisture and also its so-called combined water or water of crystallization, that is to say, the water bound, as distinguished from mere moisture, in the molecule of the chemical constitution of the bone dry clay along with its content of oxides of various metals.

The granular, acid activated clay obtained by the process of the invention possesses remarkable mechanical strength and stands up practically completely intact when immersed in water.

This granular product can be used as a desiccant (both of the static and dynamic type) and as a catalyst, for example, for polymerization of olefines, for alkylation, cracking, reforming, and isomerization reactions, or as a dehydration catalyst in the conversion of higher molecular weight aliphatic alcohols into straight or branched chain olefines, as well as a catalyst carrier generally, for different types of reactions. It can also be used in the percolation method for oil decolorizing and neutralizing, for example, to replace fuller's earth.

While the invention has been illustrated by detailed description of certain specific embodiments of it, it is understood that various substitutions and modifications can be made in them within the scope of the appended claims which are intended also to cover equivalents of any of the specific embodiments disclosed herein.

What is claimed is:

1. The preparation of a granular or coarse, activated bentonite clay applicable in percolation processes, from a raw low swelling bentonite clay, which comprises the combination of steps of contacting coarse pieces of raw low swelling bentonite clay first with hydrochloric acid in the ratio by weight of from about eight and one-half to about twenty parts of anhydrous hydrogen chloride per one hundred parts of bone dry clay for a time sufficient for the acid adequately to penetrate the clay; thereafter adding water and sulfuric acid in respective amounts to the clay thus penetrated by the hydrochloric acid to provide by weight from about twenty to about thirty parts of anhydrous sulfuric acid and a total of from about two hundred to about five hundred parts of water including the moisture contained in the raw clay used and the water content of the respective quantities of each of the hydrochloric and sulfuric acids used; then allowing the acidic aqueous phase in contact with the solid phase of the reaction mixture to exert its acidity on the solid phase for a sufficient time adequately to activate the clay; and separating the granular activated bentonite clay applicable in percolation processes from the acid aqueous slurry of fines and dissolved salts produced by the action of the acids on the bentonite starting material.

2. The preparation of a granular clay, as claimed in claim 1, wherein before contact with the hydrochloric acid the raw bentonite clay is reduced to pieces of about one-quarter inch in largest dimension and its moisture content is reduced to below about twenty percent; and the contact between the said pieces of raw bentonite clay with the hydrochloric acid is under atmospheric conditions.

3. The preparation of a granular clay, as claimed in claim 1, wherein the reaction between the solid phase and the liquid phase containing the two acids is conducted while the reaction mixture is agitated at least sufficiently for relatively uniform distribution of the solid phase in the liquid phase.

4. The preparation of a granular clay, as claimed in claim 1, wherein after the granular activated clay is separated from the fines and aqueous solution, the granular clay is washed with water to reduce the acid content of the clay at least to below about one milligram of anhydrous hydrogen chloride per gram of bone dry clay.

5. The preparation of a granular clay, as claimed in claim 4, wherein the wash water used in demineralized water.

6. The preparation of a granular clay, as claimed in claim 4, wherein the granular clay is dried after its acid content is reduced to the indicated percentage.

7. The preparation of a granular or coarse activated bentonite clay applicable in percolation processes, from a raw low swelling bentonite clay, which comprises drying the raw starting bentonite clay, where necessary, to reduce its moisture content to about fifteen percent; adding about six hundred and fifty pounds of twenty degree Baumé hydrochloric acid for each sixteen hundred pounds of starting bentonite; allowing the mixture to stand for about fifteen minutes; thereafter adding about two hundred and ninety-two pounds of sixty-six degree Baumé sulfuric acid diluted with six hundred gallons of water; and heating the mixture at between one hundred to two hundred and twenty degrees centigrade for from about ten to one and one-quarter hours; and separating the granular activated clay useful in percolation processes, from the acid aqueous slurry of fines and dissolved salts produced by the action of the acids on the starting material.

8. The method as claimed in claim 7, wherein the heating of the reaction mixture is at between one hundred and one hundred and five degrees centigrade and to hold it at that range for about ten hours.

9. The preparation of a granular or coarse, activated bentonite clay applicable in percolation processes, from a raw low swelling bentonite clay, which comprises the combination of steps of contacting coarse pieces of raw low swelling bentonite clay first with hydrochloric acid in the ratio by weight of from about eight and one-half to about twenty parts of anhydrous hydrogen chloride per one hundred parts of bone dry clay for a time sufficient for the acid adequately to penetrate the clay; thereafter adding water and sulfuric acid in respective amounts to the clay thus penetrated by the hydrochloric acid to provide by weight from about twenty to about thirty parts of anhydrous sulfuric acid and a total of from about two hundred to about five hundred parts of water including the moisture contained in the raw clay used and the water content of the respective quantities of each of the hydrochloric and sulfuric acids used; then allowing the acidic aqueous phase in contact with the solid phase of the reaction mixture to exert its acidity on the solid phase at an elevated temperature below that at which the combined water in the clay is disaggregated from it and for a sufficient time adequately to activate the clay; and separating the granular activated bentonite clay applicable in percolation processes from the acid aqueous slurry of fines and dissolved salts produced by the action of the acids on the bentonite starting material.

10. The preparation of a granular clay, as claimed in claim 9, wherein the reaction between the solid phase and the liquid phase containing the hydrochloric and sulfuric acids is conducted at a temperature at least as high as the boiling point of the reaction mixture.

11. The preparation of a granular clay, as claimed in claim 10, wherein the reaction between the solid phase and the liquid phase containing the two acids is conducted at superatmospheric pressure.

12. The preparation of a granular clay, as claimed in claim 11, wherein the pressure is between about three and ten atmospheres.

References Cited in the file of this patent

UNITED STATES PATENTS

| | | |
|---|---|---|
| 1,649,366 | Potter | Nov. 15, 1927 |
| 2,180,576 | Baylis et al. | Nov. 21, 1939 |
| 2,207,145 | Doht | July 9, 1940 |
| 2,446,273 | Gary | Aug. 3, 1948 |
| 2,671,058 | Mickelson | Mar. 2, 1954 |